United States Patent
Hatzilias et al.

(10) Patent No.: US 10,877,268 B2
(45) Date of Patent: Dec. 29, 2020

(54) ACTIVE CONTROL OF IN-FIELD LIGHT SOURCES OF A HEAD MOUNTED DISPLAY

(71) Applicant: Facebook Technologies, LLC, Menlo Park, CA (US)

(72) Inventors: Karol Constantine Hatzilias, Kenmore, WA (US); Robin Sharma, Redmond, WA (US); Andrew John Ouderkirk, Redmond, WA (US); Qi Zhang, Kirkland, WA (US); Christopher Yuan-Ting Liao, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/386,009

(22) Filed: Apr. 16, 2019

(65) Prior Publication Data
US 2020/0333592 A1 Oct. 22, 2020

(51) Int. Cl.
*G02B 27/00* (2006.01)
*H04N 5/33* (2006.01)
*G02B 27/01* (2006.01)

(52) U.S. Cl.
CPC ..... *G02B 27/0093* (2013.01); *G02B 27/0172* (2013.01); *H04N 5/33* (2013.01); *G02B 2027/014* (2013.01); *G02B 2027/0138* (2013.01); *G02B 2027/0178* (2013.01)

(58) Field of Classification Search
CPC ............ G02B 27/0093; G02B 27/0172; G02B 2027/0178; G02B 2027/0138; G02B 2027/014; H04N 5/33
See application file for complete search history.

(56) References Cited

U.S. PATENT DOCUMENTS

| | | | |
|---|---|---|---|
| 8,878,749 B1* | 11/2014 | Wu | G01S 17/06 345/8 |
| 9,454,699 B2* | 9/2016 | Agrawal | H04N 5/33 |
| 9,645,396 B2* | 5/2017 | Andes | G02B 27/017 |
| 10,012,829 B2* | 7/2018 | Bailey | G02B 27/0176 |
| 10,031,576 B2* | 7/2018 | Cunningham | G10L 13/02 |
| 10,031,579 B2* | 7/2018 | Raffle | G02B 27/017 |
| 10,054,788 B2* | 8/2018 | Bailey | G02B 27/30 |
| 10,067,337 B2* | 9/2018 | Bailey | G02B 26/10 |
| 10,078,254 B2* | 9/2018 | Higashitsutsumi | A61B 5/00 |
| 10,234,940 B2* | 3/2019 | Mardanbegi | A61B 3/113 |
| 10,278,576 B2* | 5/2019 | Hwang | A61B 3/113 |

(Continued)

FOREIGN PATENT DOCUMENTS

EP 3079560 A1 10/2016

OTHER PUBLICATIONS

U.S. Appl. No. 16/386,024, Karol Constantine Hatzilias.

(Continued)

*Primary Examiner* — Chad M Dicke
(74) *Attorney, Agent, or Firm* — Freestone Intellectual Property Law PLLC; Aaron J. Visbeek; Andrew J. Cameron

(57) ABSTRACT

A method for the active control of in-field light sources of a head mounted display (HMD) includes receiving an image of an eye of a user of the HMD, where the image is captured by an eye-tracking camera in response to infrared light emitted by a plurality of in-field light sources. The method also includes selectively disabling at least one of the in-field light sources based on information from the image of the eye.

17 Claims, 11 Drawing Sheets

(56) References Cited

U.S. PATENT DOCUMENTS

| | | | | |
|---|---|---|---|---|
| 10,279,192 B2* | 5/2019 | Malchano | ........... | A61B 5/04845 |
| 10,298,904 B1* | 5/2019 | Dolgoff | ................ | H04N 13/332 |
| 10,307,057 B2* | 6/2019 | Kanamori | ................ | A61B 3/117 |
| 10,409,057 B2* | 9/2019 | Aleem | .................... | G02B 27/01 |
| 2009/0059615 A1* | 3/2009 | Wainright | ............ | G02B 6/0008 |
| | | | | 362/555 |
| 2011/0228975 A1* | 9/2011 | Hennessey | ............. | A61B 3/113 |
| | | | | 382/103 |
| 2012/0050681 A1 | 3/2012 | Bonnin et al. | | |
| 2013/0114850 A1 | 5/2013 | Publicover et al. | | |
| 2015/0193920 A1* | 7/2015 | Knee | .................. | H04N 5/23229 |
| | | | | 382/154 |
| 2016/0210497 A1* | 7/2016 | Rougeaux | ............ | G06K 9/0061 |
| 2016/0370591 A1* | 12/2016 | Wilson | ............... | G02B 27/0172 |
| 2017/0329398 A1* | 11/2017 | Raffle | ................ | G02B 27/0093 |
| 2018/0101988 A1* | 4/2018 | Murillo | .............. | G02B 27/0172 |
| 2018/0350236 A1* | 12/2018 | Yamaguchi | ......... | G08G 1/09626 |
| 2019/0045100 A1* | 2/2019 | Michishita | .............. | G06T 5/001 |
| 2019/0138094 A1* | 5/2019 | Miettinen | ........... | G06K 9/00604 |
| 2019/0230306 A1* | 7/2019 | Liu | ....................... | H04N 5/3559 |
| 2019/0244005 A1* | 8/2019 | Suzuki | ..................... | G06F 3/013 |
| 2019/0317597 A1* | 10/2019 | Aleem | ............... | G02B 27/0179 |
| 2019/0361525 A1* | 11/2019 | Xiao | ........................ | G06T 5/008 |
| 2020/0012101 A1* | 1/2020 | Yuki | .................... | G02B 27/0101 |

OTHER PUBLICATIONS

Non-Final Office Action, U.S. Appl. No. 16/386,024, Notification Date: Jun. 23, 2020, 12 pages.

Hong, Hua et al., A compact eyetracked optical see-through head-mounted display, Proceedings of Spie, Feb. 9, 2012, 10pg, vol. 8288.

International Searching Authority, Patent Cooperation Treaty, European Application No. PCT/US2020/026005, Notification Date: Jul. 10, 2020, 12 pages.

International Searching Authority, Patent Cooperation Treaty, European Application No. PCT/US2020/026217, Notification Date: Jun. 29, 2020, 11 pages.

* cited by examiner

US 10,877,268 B2

ACTIVE CONTROL OF IN-FIELD LIGHT SOURCES OF A HEAD MOUNTED DISPLAY

CROSS-REFERENCE TO RELATED APPLICATIONS

This application is related to a U.S. non-provisional patent application entitled, "KEEP-OUT ZONE FOR IN-FIELD LIGHT SOURCES OF A HEAD MOUNTED DISPLAY," filed Apr. 16, 2019.

FIELD OF DISCLOSURE

Aspects of the present disclosure relate generally to head mounted displays, and in particular but not exclusively, relate to in-field light sources of a head mounted display.

BACKGROUND

A head mounted display (HMD) is a display device, typically worn on the head of a user. HMDs may be used in a variety of applications, such as gaming, aviation, engineering, medicine, entertainment and so on to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof. Some HMDs perform eye-tracking which may enhance the user's viewing experience. Eye-tracking may be aided, in some cases, by illuminating the eye of the user. Thus, some conventional HMDs may incorporate an eye-tracking system that includes an illumination source as well as a camera for tracking movements of the user's eye. However, in some cases the arrangement of the illumination source within the HMD may impede or otherwise interfere with the eye-tracking system.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

DETAILED DESCRIPTION

Various aspects and embodiments are disclosed in the following description and related drawings to show specific examples relating to the control and/or disposition of in-field light sources for a head mounted display (HMD). Alternate aspects and embodiments will be apparent to those skilled in the pertinent art upon reading this disclosure and may be constructed and practiced without departing from the scope or spirit of the disclosure. Additionally, well-known elements will not be described in detail or may be omitted so as to not obscure the relevant details of the aspects and embodiments disclosed herein.

As mentioned above, an HMD may include an eye-tracking system that comprises an illumination source for illuminating an eye of the user and a camera for capturing images of the eye. Conventional designs may place the illumination light sources on the edges (i.e., outside) of the field of view of the user (e.g. rim of the frame) so that the illumination light sources don't introduce noticeable occlusions into the field of view of the user. In contrast, aspects of the present disclosure provide a near-eye optical element for an HMD that includes a plurality of in-field light sources (e.g., micro-LEDs and/or vertical cavity surface emitting laser (VCSEL) diodes) that illuminate the eye with light (e.g., infrared light). Although the in-field light sources may be in the field-of view of a user of the HMD, the light sources may be so small (e.g. 300 microns or less) such that the light sources themselves, are unnoticeable or result in insignificant occlusion to the user.

Figure 1:
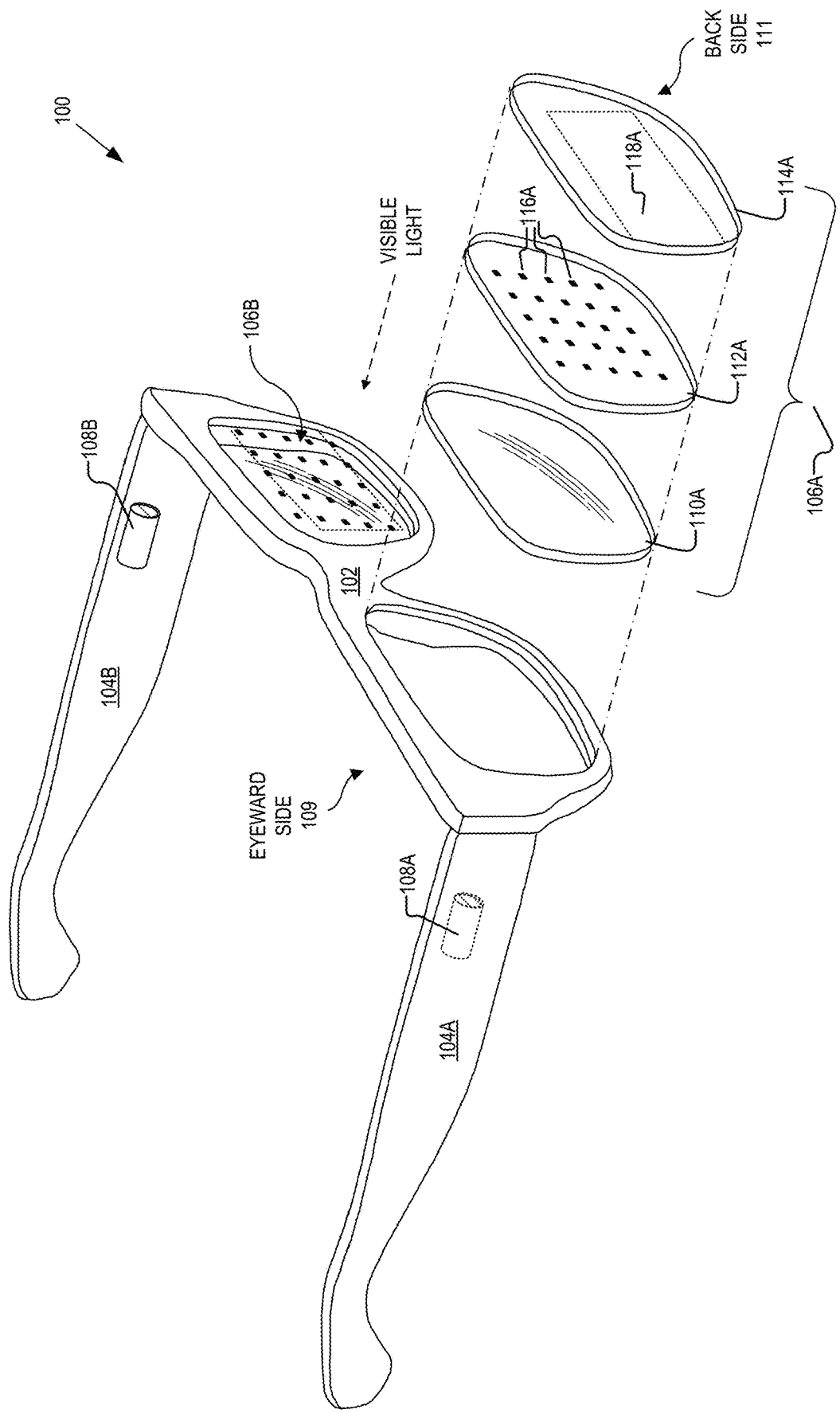
FIG. 1 illustrates a head mounted display (HMD), in accordance with aspects of the present disclosure.

FIG. 1 illustrates an example HMD 100, in accordance with aspects of the present disclosure. The illustrated example of HMD 100 is shown as including a frame 102, temple arms 104A and 104B, and near-eye optical elements 106A and 106B. Eye-tracking cameras 108A and 108B are shown as coupled to temple arms 104A and 104B, respectively. FIG. 1 also illustrates an exploded view of an example of near-eye optical element 106A. Near-eye optical element 106A is shown as including an optically transparent layer 110A, an illumination layer 112A, and a display layer 114A. Illumination layer 112A is shown as including a plurality of in-field light sources 116A and display layer 114A is shown as including an optical combiner 118A.

As shown in FIG. 1, frame 102 is coupled to temple arms 104A and 104B for securing the HMD 100 to the head of a user. Example HMD 100 may also include supporting hardware incorporated into the frame 102 and/or temple arms 104A and 104B. The hardware of HMD 100 may include any of processing logic, wired and/or wireless data interface for sending and receiving data, graphic processors, and one or more memories for storing data and computer-executable instructions. Further details regarding the supporting hardware of HMD 100 will be described below with respect to FIG. 6. In one example, HMD 100 may be configured to receive wired power and/or may be configured to be powered by one or more batteries. In addition, HMD 100 may be configured to receive wired and/or wireless data including video data.

FIG. 1 illustrates near-eye optical elements 106A and 106B that are configured to be mounted to the frame 102. In some examples, near-eye optical elements 106A and 106B may appear transparent to the user to facilitate augmented reality or mixed reality such that the user can view scene light (e.g., visible light) from the environment while also receiving display light directed to their eye(s) by way of display layer 114A. In further examples, some or all of near-eye optical elements 106A and 106B may be incorporated into a virtual reality headset where the transparent nature of the near-eye optical elements 106A and 106B allows the user to view an electronic display (e.g., a liquid crystal display (LCD), an organic light emitting diode (OLED) display, a micro-LED display, etc.) incorporated in the virtual reality headset.

As shown in FIG. 1, illumination layer 112A includes a plurality of in-field light sources 116A. As will be described below, each in-field light source 116A may be disposed on a transparent substrate and may be configured to emit light towards an eyeward side 109 of the near-eye optical element 106A. In some aspects, the in-field light sources 116A are configured to emit near infrared light (e.g. 750 nm-1.4 μm). Each in-field light source 116A may be a micro light emitting diode (micro-LED), an edge emitting LED, or a vertical cavity surface emitting laser (VCSEL) diode.

As mentioned above, conventional eye-tracking solutions may provide light sources disposed around a rim/periphery of a lens. However, placing light sources within the field of view of the eye may be advantageous for computation of specular or "glint" reflections that can be imaged by a camera such as eye-tracking camera 108A that is positioned to image the eye of a wearer of HMD 100. Furthermore, the ability to selectively illuminate each in-field light source 116A individually (or in groups) may help save power and provide faster and more precise eye-tracking measurements.

While in-field light sources 116A may introduce minor occlusions into the near-eye optical element 106A, the in-field light sources 116A, as well as their corresponding routing may be so small as to be unnoticeable or insignificant to a wearer of HMD 100. Additionally, any occlusion from in-field light sources 116A will be placed so close to the eye as to be unfocusable by the human eye and therefore assist in the in-field light sources 116A being not noticeable or insignificant. In some embodiments, each in-field light source 116A has a footprint (or size) that is less than about 200×200 microns.

As mentioned above, the in-field light sources 116A of the illumination layer 112A may be configured to emit light towards the eyeward side 109 of the near-eye optical element 106A to illuminate the eye of a user. The near-eye optical element 106A is shown as including optical combiner 118A (included in display layer 114A), where the optical combiner 118A is disposed between the illumination layer 112A and a back side 111 of the near-eye optical element 106A. In some aspects, the optical combiner 118A is configured to receive reflected infrared light that is reflected by the eye of the user and to direct the reflected infrared light towards the eye-tracking camera 108A. In some examples, the eye-tracking camera 108A is an infrared camera configured to image the eye of the user based on the received reflected infrared light. In some aspects, the optical combiner 118A is transmissive to visible light, such as light incident on the back side 111 of the near-eye optical element 106A. In some examples, the optical combiner 118A may be configured as a volume hologram and/or may include one or more Bragg gratings for directing the reflected infrared light towards the eye-tracking camera 108A.

Display layer 114A may include one or more other optical elements depending on the design of the HMD 100. For example, the display layer 114A may include a waveguide (not shown in FIG. 1) to direct display light generated by an electronic display to the eye of the user. In some implementations, at least a portion of the electronic display is included in the frame 102 of the HMD 100. The electronic display may include an LCD, an organic light emitting diode (OLED) display, micro-LED display, pico-projector, or liquid crystal on silicon (LCOS) display for generating the display light.

Optically transparent layer 110A is shown as being disposed between the illumination layer 112A and the eyeward side 109 of the near-eye optical element 106A. The optically transparent layer 110A may receive the infrared light emitted by the illumination layer 112A and pass the infrared light to illuminate the eye of the user. As mentioned above, the optically transparent layer 110A may also be transparent to visible light, such as scene light received from the environment, or display light received from the display layer 114A. In some examples, the optically transparent layer 110A has a curvature for focusing light (e.g., display light and/or scene light) to the eye of the user. Thus, the optically transparent layer 110A may, in some examples, may be referred to as a lens. In some aspects, the optically transparent layer 110A has a thickness and/or curvature that corresponds to the specifications of a user. In other words, the optically transparent layer 110A may be a prescription lens. However, in other examples, the optically transparent layer 110A may be a non-prescription lens, also known as a plano lens.

Figure 2:
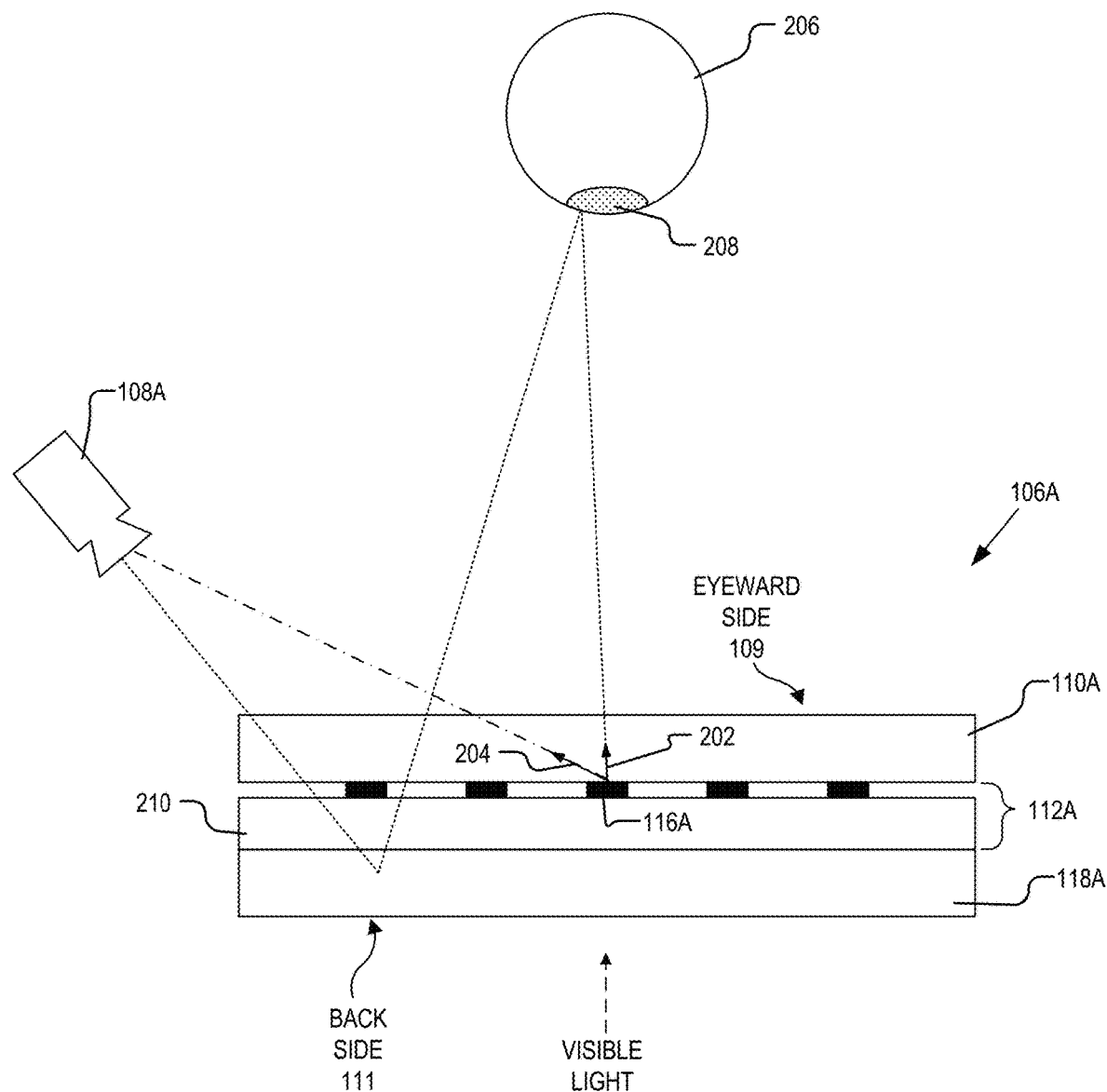
FIG. 2 illustrates an eye-tracking camera receiving direct light and reflected light emitted by an in-field light source of a near-eye optical element.

FIG. 2 illustrates an eye-tracking camera 108A receiving direct light 204 and reflected light 202 emitted by an in-field light source 116A of near-eye optical element 106A. In the example of FIG. 2, the illumination layer 112A is shown as including a transparent substrate 210 and a plurality of in-field light sources 116A disposed thereon. In some examples, the in-field light sources 116A are VCSEL diodes formed on the transparent substrate 210 (e.g., glass, sapphire, plastic, flexible film, etc.) along with one or more transparent routing (e.g., transparent conductive oxide). As mentioned above, each of the in-field light sources 116A are configured to emit infrared light towards the eyeward side 109 of the near-eye optical element 106A to illuminate the eye 206 of a user. The light emitted by in-field light source 116A may follow numerous optical paths. For example, light 202 is shown as following an optical path that includes propagating through optically transparent layer 110A, reflecting off the eye 206, then propagating back through the optically transparent layer 110A, through the illumination layer 112A to the optical combiner 118A, which then directs the reflected light 202 towards the eye-tracking camera 108A for imaging.

In some examples, the reflected light 202 is a specular reflection that is reflected off a cornea 208 of the eye 206 (also referred to as a "glint" or "conical" reflection). In operation, the eye-tracking camera 108A may capture an image of the eye 206 that includes one or more specular reflections. In some aspects, these specular reflections appear in the captured image as intensity peaks, which may be detected by an eye-tracking module of the HMD. The eye-tracking module may then localize the detected specular reflections to determine eye-tracking information (e.g., position, orientation, gaze angle, etc. of the eye 206). For example, the eye-tracking module may determine whether the eye 206 is looking in the straight, left, right, upwards, or downwards direction.

However, FIG. 2 illustrates the eye-tracking camera 108A as also receiving direct light 204 that is also emitted by the in-field light source 116A. That is, some of the infrared light emitted by the in-field light source 116A, such as reflected light 202 may reflect off of the eye 206, whereas other infrared light emitted by the in-field light source 116A, such as direct light 204 (e.g., infrared light emitted at wide angles), may be incident on the eye-tracking camera 108A without reflecting off the eye 206. In some examples, this direct view of the in-field light source 116A results in a corresponding intensity peak in the image captured by eye-tracking camera 108A. As will be described in more detail below, in some cases the direct view of the in-field light sources 116A may impede the detection of one or more of the specular reflections by the eye-tracking module.

Figure 3A:
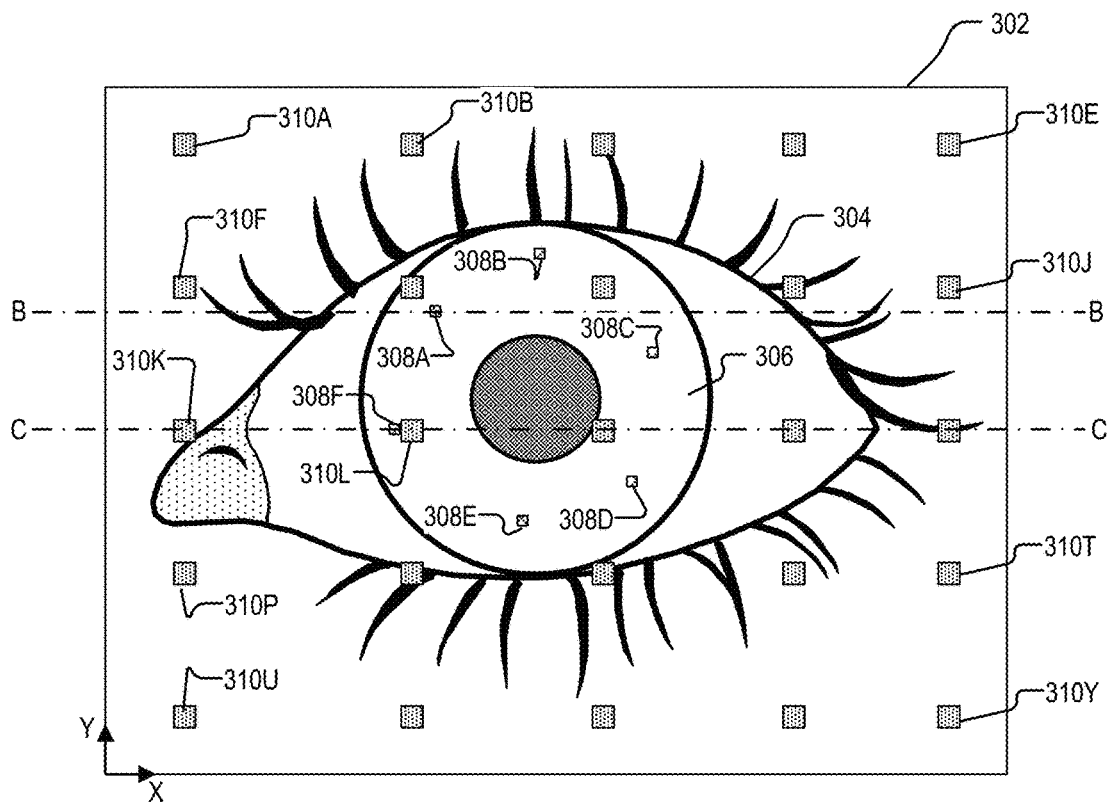
FIG. 3A illustrates an image captured by an eye-tracking camera, in accordance with aspects of the present disclosure.

By way of example, FIG. 3A illustrates an image 302 captured by an eye-tracking camera, such as eye-tracking camera 108A of FIGS. 1 and 2. As shown in FIG. 3A, the image 302 may include an imaging of an eye 304 of a user of the HMD, which may be generated in response to infrared light emitted by the in-field light sources (e.g., in-field light sources 116A), reflected off one or more diffuse surfaces of the eye, and then directed to the eye-tracking camera 108A by way of an optical combiner (e.g., optical combiner 118A). The image 302 also includes several specular reflections 308A-F, where the specular reflections 308A-F represent infrared light reflecting off the cornea 306 region of the eye (e.g., reflected light 202 of FIG. 2). Even still, the image 302 further includes direct-views 310A-Y of the in-field light sources (e.g., in-field light sources 116A) which may be generated in response to direct light emitted by the in-field light sources, such as direct light 204 of FIG. 2.

Figure 3B:
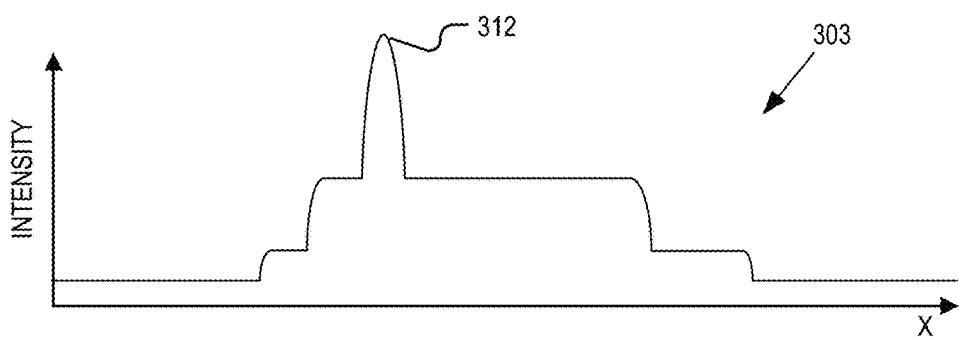
FIG. 3B illustrates an intensity profile of the image of FIG. 3A taken along sectional line B-B.
Figure 3C:
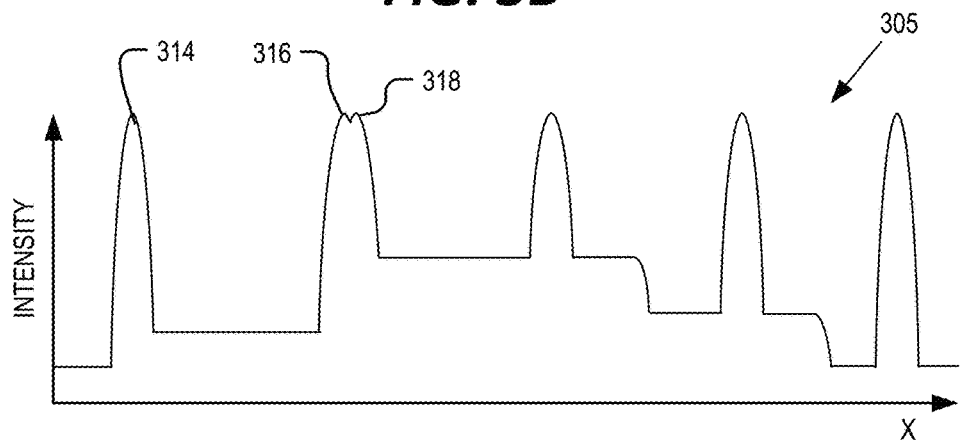
FIG. 3C illustrates an intensity profile of the image of FIG. 3A taken along sectional line C-C.

In some examples, the specular reflections 308A-F may be represented within the image 302 as intensity peaks. By way of example, FIG. 3B illustrates an intensity profile 303 of the image 302 of FIG. 3A taken along sectional line B-B. As shown in FIG. 3A, the intensity profile 303 includes an intensity peak 312 which corresponds to the location of specular reflection 308A within image 302. In operation, the eye-tracking module may detect and/or localize the specular reflections based on the detection of the corresponding intensity peaks, such as intensity peak 312. However, as mentioned above, the direct-views of the in-field light sources may also generate intensity peaks within the image. For example, FIG. 3C illustrates an intensity profile 305 of the image 302 of FIG. 3A taken along sectional line C-C. As shown in FIG. 3C, the intensity profile 305 includes an intensity peak 314 which corresponds to a direct-view 310K of an in-field light source. Each of the remaining direct-views 310A-Y may also include a corresponding intensity peak within the image 302. In some implementations, the location of the in-field light sources within the illumination layer (e.g., illumination layer 112A) is fixed. Thus, the location of the corresponding direct-views 310A-Y may also be known by the eye-tracking module, which may aide the eye-tracking module in distinguishing between the location of specular reflections and the location of the direct-views 310A-Y of the in-field light sources. However, in some instances a direct-view of an in-field light source may impede the detection of a specular reflection, such as when the specular reflection appears within the image 302 at or near the location of a direct-view of an in-field light source. For example, FIG. 3C illustrates an intensity peak 316, which corresponds with the location of specular reflection 308F within image 302, and an intensity peak 318 which corresponds with the location of the direct-view 310L. In some instances, the close proximity of the specular reflection 308F to the direct-view 310L within image 302 may impede the eye-tracking module's ability to detect the specular reflection 308F. That is, the eye-tracking module may be unable to distinguish between the intensity peak 316 and the intensity peak 318, which may decrease accuracy and/or increase the processing time of the determination of the eye-tracking information.

Accordingly, aspects of the present disclosure provide one or more mechanisms for reducing or eliminating the occurrences of a direct-view of an in-field light source from impeding the detection of the specular reflections that are present in an image captured by an eye-tracking camera of an HMD. In one aspect, active control of the in-field light sources is provided for selectively enabling/disabling one or more of the in-field light sources based on information from the captured image. For example, a computing device, such as one incorporated with the HMD, may determine a current location of the eye (e.g., location of the cornea, pupil, iris, etc.) within the image captured by the eye-tracking camera and then selectively disable an in-field light source based on the current location. As will be discussed below, the determination of which in-field light sources to disable may be based on a predetermined radius of the current location of the eye, or it may be based on a predicted future location of the eye within a subsequent image. In another aspect, the illumination layer (e.g., illumination layer 112A of FIG. 1) is configured to include a static keep-out zone. The keep-out zone may be a region of the illumination layer that does not include any in-field light sources. That is, the illumination layer may include several in-field light sources disposed therein, but where all of the in-field light sources are disposed outside of the keep-out zone. Further details regarding both the active control of the in-field light sources and the static keep-out zone for the in-field light sources are described below.

Active Control of In-Field Light Sources

In some aspects, the active control of the in-field light sources includes selectively disabling and/or enabling an in-field light source based on information from an image captured by the eye-tracking camera. Determining which of the in-field light sources to disable/enable may be based on information obtained from the image such as the current location of the eye, the current location of the pupil, the current location of the iris, the location(s) of specular reflections, a predicted future location of the eye, pupil, or iris, and so on.

Figure 4A:
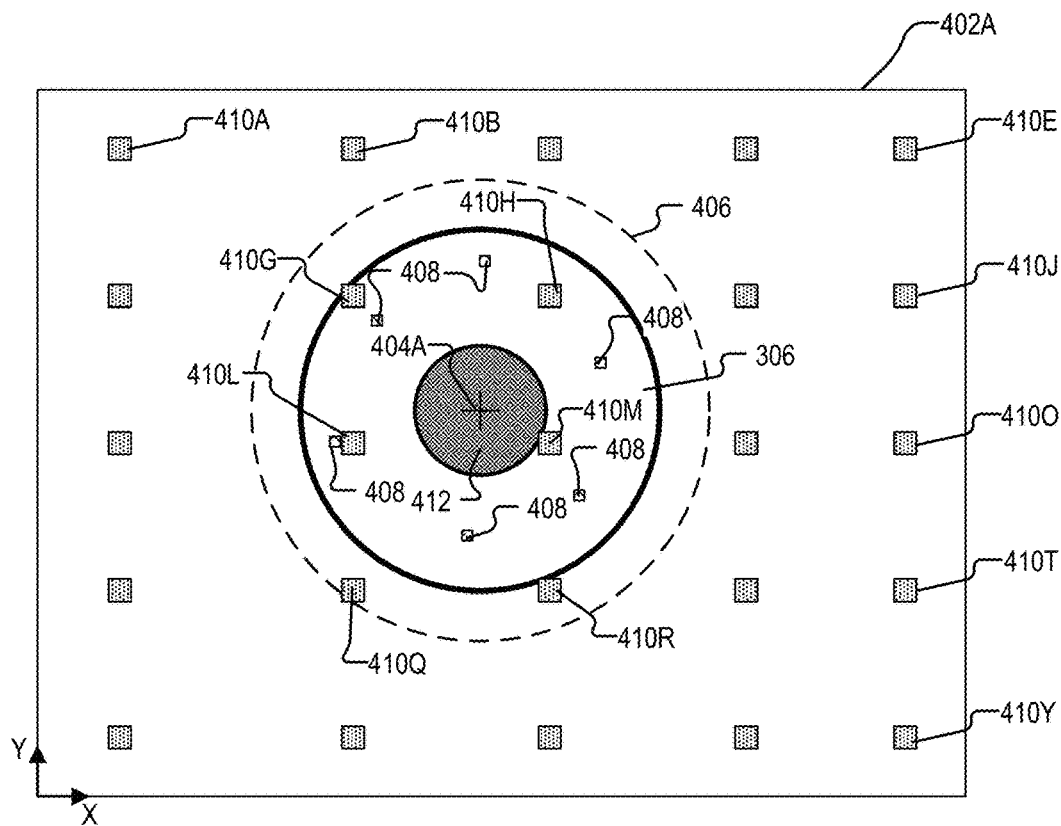
FIGS. 4A and 4B are example images captured by an eye-tracking camera that illustrate the active control of in-field light sources based on information from the image, in accordance with aspects of the present disclosure.

For example, FIG. 4A illustrates an example image 402A captured by an eye-tracking camera (e.g., eye-tracking camera 108A) that shows the active control of in-field light sources based on information from the image 402A, in accordance with aspects of the present disclosure. In some examples, the information obtained from the image 402A may represent a keep-out zone. In some examples, the keep-out zone represents a region of the image 402A that corresponds to one or more features of the eye 304, such as a region occupied by the cornea 306, a region occupied by the pupil 412, and/or a region occupied by the iris (not explicitly illustrated) of the eye 304. In other examples, the keep-out zone represents a current location of the eye, pupil, cornea, and/or iris. In yet another example, the keep-out zone corresponds to the location of one or more of the specular reflections appearing in the image 402A.

In the example of FIG. 4A, a keep-out zone is shown as a current location 404A of the eye 304 within the image 402A. The current location 404A may be determined where active control of the in-field light sources includes disabling the in-field light sources that appear within a predetermined radius 406 of the keep-out zone (e.g., within radius 406 of the current location 404A). In some aspects, the current location 404A of the eye 304 is a center of the cornea 306 and/or a center of the pupil 412. In some examples, the current location 404A may represent a center of the iris. In yet another example, the current location 404A may represent the location of one or more specular reflections. The current location 404A may be determined based on a determined location of one or more specular reflections 408 in image 402A and/or based on a determined location of one or more specular reflections in a previous image captured by the eye-tracking camera.

In some examples, the size of radius 406 is predetermined and represents a region where if a direct-view of a corresponding in-field light source appears, means that the corresponding in-field light source will be disabled. That is, in the illustrated example, the direct-views 410G, 410H, 410L, 410M, 410Q, and 410R are all located within the radius 406. Thus, the in-field light sources corresponding to the direct-views 410G, 410H, 410L, 410M, 410Q, and 410R may all be disabled so as to prevent these direct-views from impeding the detection of the specular reflections 408.

As shown in FIG. 4A, the radius 406 is larger than a size of the imaged cornea 306. In some examples, the images are captured and processed at a predetermined sampling rate (e.g., 200 Hz). Thus, a size of the radius 406 may be large enough to account for all eye movements possible before the next image is acquired. For example, radius 406 of FIG. 4A is illustrated as encompassing direct-view 410R such that the in-field light source corresponding to direct-view 410R is disabled should a position of the eye move down and to the right. Similarly, the radius 406 also encompasses the direct-view 410Q such that the in-field light source corresponding to direct-view 410Q is disabled should the position of the eye move down and to the left.

Figure 4B:
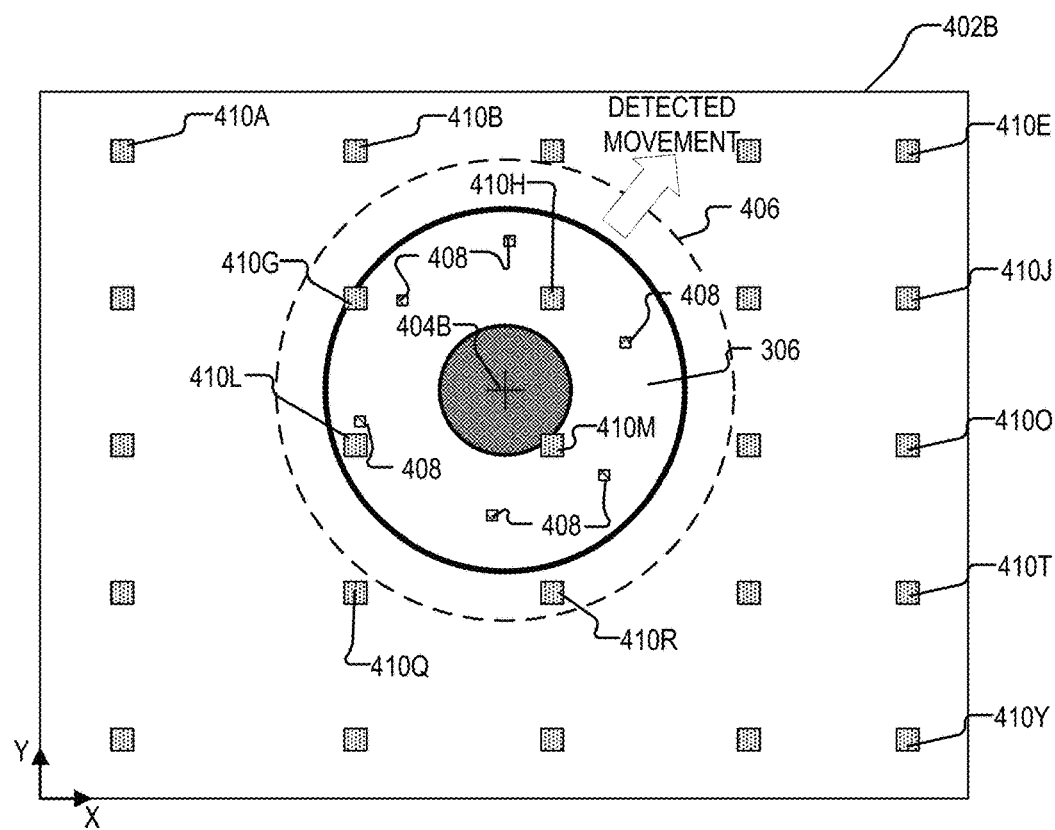

FIG. 4B illustrates a subsequent image 402B (e.g., subsequent to image 402A of FIG. 4A) captured by an eye-tracking camera. An updated keep-out zone may be determined based on information obtained from the subsequent image 402B. In particular, FIG. 4B illustrates a keep-out zone that corresponds to a location 404B of the eye and may be determined based on the detection of the specular reflections 408 present in subsequent image 402B. As shown in the example of FIG. 4B, the updated location 404B has moved up and to the right with respect to the location 404A of FIG. 4A. Thus, since the radius 406 is based on the detected location of the eye (e.g., updated location 404B), the radius 406 has also moved up and to the right, as shown in image 402B of FIG. 4B. Accordingly, the in-field light sources corresponding to direct-views 410G, 410H, 410L, 410M, and 410R may remain disabled. However, as shown in FIG. 4B, the direct-view 410Q is no longer within the radius 406 and thus, the in-field light source corresponding to direct-view 410Q may be enabled to resume emitting infrared light.

The above examples of FIGS. 4A and 4B illustrate one aspect of the present disclosure where in-field illuminators are selectively disabled if their corresponding direct-view (e.g., direct views 410A-Y) appear within the predetermined radius 406 of a keep-out zone (e.g., the current location 404A/404B of the eye). As described above, the radius 406 may be sized to account for a variety of possible (e.g., unknown future movements of the eye). In another aspect, the active control of in-field light sources may be based on a predicted future keep-out zone (e.g., predicted future location of eye) rather than being based on the predetermined radius from the current keep-out zone.

Figure 5:
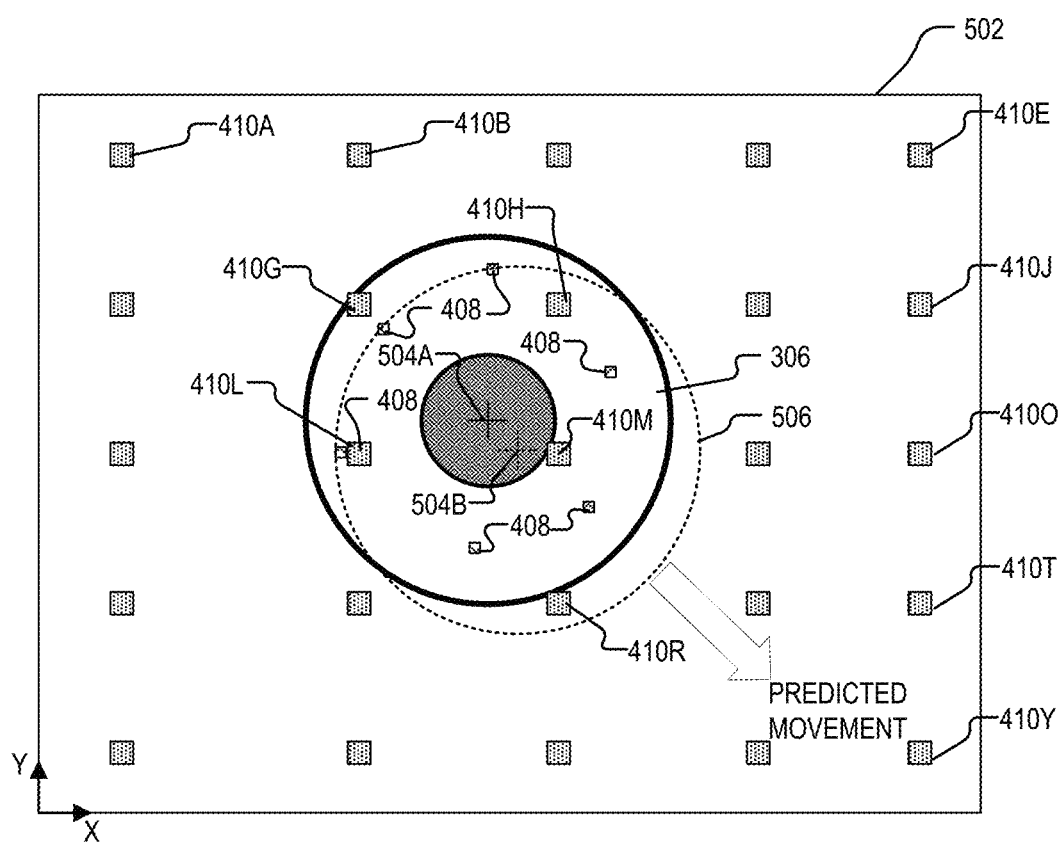
FIG. 5 is an example image captured by an eye-tracking camera that illustrates the active control of in-field light sources based on a predicted future location of the eye within the image, in accordance with aspects of the present disclosure.

For example, FIG. 5 is an example image 502 captured by an eye-tracking camera (e.g., eye-tracking camera 108A of FIGS. 1 and 2) that illustrates the active control of in-field light sources based on a predicted future keep-out zone (e.g., predicted future location 504B of the eye), in accordance with aspects of the present disclosure. The current location 504A of the eye may be determined based on a determined location of the specular reflections 408 in image 502. In some examples, the current location 504A of the eye may be fed to a model of the eye to determine the predicted future location 504B of the eye. That is, the predicted future location 504B of the eye is a prediction of where the eye will be located in a subsequent image. In some aspects, the model may be a Hidden Markov Model (HMM) that generates the predicted future location 504B based on a plurality of previous determined locations of the eye. In other aspects, a Kalman filter may be applied to previous determined locations of the eye to generate the predicted future location 504B. In some examples, the generated prediction includes a prediction of the eye's movement, orientation, and/or location.

Based on the predicted future location 504B, the system may determine a radius 506 which dictates which in-field light sources to disable. In some examples, radius 506 represents a region of where the cornea 306 is predicted to appear in a subsequent image. Thus, in some aspects, the size of radius 506 corresponds to a determined size of the cornea 306.

With regards to the specific example of FIG. 5, the predicted future location 504B is determined based, at least, on the current location 504A of the eye (e.g., by feeding the current location 504A into a model). As shown in the example of FIG. 5, the predicted movement of the eye is down and to the right. In response to obtaining the predicted future location 504B, the system determines a radius 506. Assuming that the in-field light sources corresponding to direct-views 410G, 410H, 410L, 410M, and 410R were previously disabled, the system may then: (1) enable the in-field light source corresponding to direct-view 410G (e.g., since direct-view 410G is not located within radius 506); (2) keep the in-field light sources corresponding to direct-views 410H, 410L and 410M disabled (e.g., since direct-views 410H, 410L, and 410M remain within radius 506); and (3) disable the in-field light source corresponding to direct-view 410R (e.g., since direct-view 410R is now within the radius 506).

Figure 6:
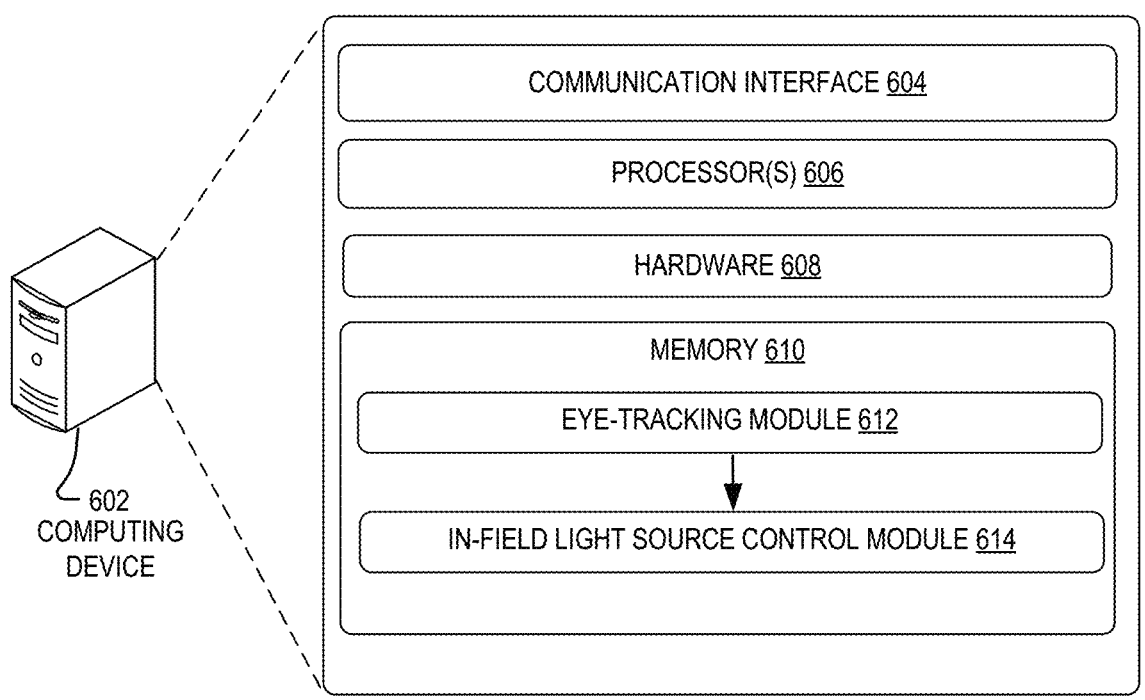
FIG. 6 illustrates an example computing device for the active control of in-field light sources, in accordance with aspects of the present disclosure.

FIG. 6 illustrates an example computing device 602 for the active control of in-field light sources, in accordance with aspects of the present disclosure. The illustrated example of computing device 602 is shown as including a communication interface 604, one or more processors 606, hardware 608, and a memory 610. In one example, one or more of the components illustrated in FIG. 6 may be incorporated into the frame 102 and/or temple arms 104A/104B of the HMD 100 of FIG. 1. In other examples, one of more of the components illustrated in FIG. 6 may be incorporated into a remote computing device that is communicatively coupled to the HMD 100 for performing one or more aspects of the active control of the in-field light sources.

The communication interface 604 may include wireless and/or wired communication components that enable the computing device 602 to transmit data to and receive data from other networked devices. The hardware 608 may include additional hardware interface, data communication, or data storage hardware. For example, the hardware interfaces may include a data output device (e.g., electronic display, audio speakers), and one or more data input devices.

The memory 610 may be implemented using computer-readable media, such as computer storage media. In some aspects, computer-readable media may include volatile and/or non-volatile, removable and/or non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The processors 606 and the memory 610 of the computing device 602 may implement an eye-tracking module 612 and an in-field light source control module 614. The eye-tracking module 612 and the in-field light source control module 614 may include routines, program instructions, objects, and/or data structures that perform particular tasks or implement particular abstract data types. The memory 610 may also include a data store (not shown) that is used by the eye-tracking module 612 and/or in-field light source control module 614.

The eye-tracking module 612 may be configured to determine eye-tracking information (e.g., location, orientation, gaze angle, etc. of the eye). In some aspects, the eye-tracking module 612 may determine the eye-tracking information based on one or more images captured by the eye-tracking camera (e.g., eye-tracking camera 108A) of the HMD. For example, the eye-tracking module 612 may be configured to receive an image captured by the eye-tracking camera, process the image to detect one or more specular reflections (e.g., based on a detection of the intensity peaks), and determine a current keep-out zone (e.g., current locations 404A/404B of FIGS. 4A and 4B) based on information obtained from the captured image (e.g., locations of the specular reflections). In some examples, the eye-tracking module 612 may also determine a predicted future keep-out zone (e.g., predicted future location 504B of FIG. 5) based on the current keep-out zone (e.g., current location 504A of FIG. 5).

The in-field light source control module 614 may be configured to receive the current location and/or predicted future location of the eye from the eye-tracking module 612 and perform the active control of one or more of the in-field light sources in response thereto. In some aspects, the in-field light source control module 614 includes an interface and/or logic for individually controlling each of the in-field light sources (e.g., in-field light sources 116A). In one aspect, enabling an in-field light source includes generating a control signal to cause a particular in-field light source to emit infrared light. Similarly, disabling an in-field light source includes generating a control signal to cause a particular in-field light source to cease emitting infrared light. For example, the in-field light source control module 614 may selectively disable at least one in-field light source in response to determining that a direct-view of the at least one in-field light source in a subsequent image will impede the detection of at least one specular reflection in the subsequent image. In various aspects, this determination may be based on the predetermined radius (e.g., predetermined radius 406 of FIGS. 4A and 4B) from the current location or it may be based on the predicted future location (e.g., predicted future location 504B of FIG. 5).

Figure 7:
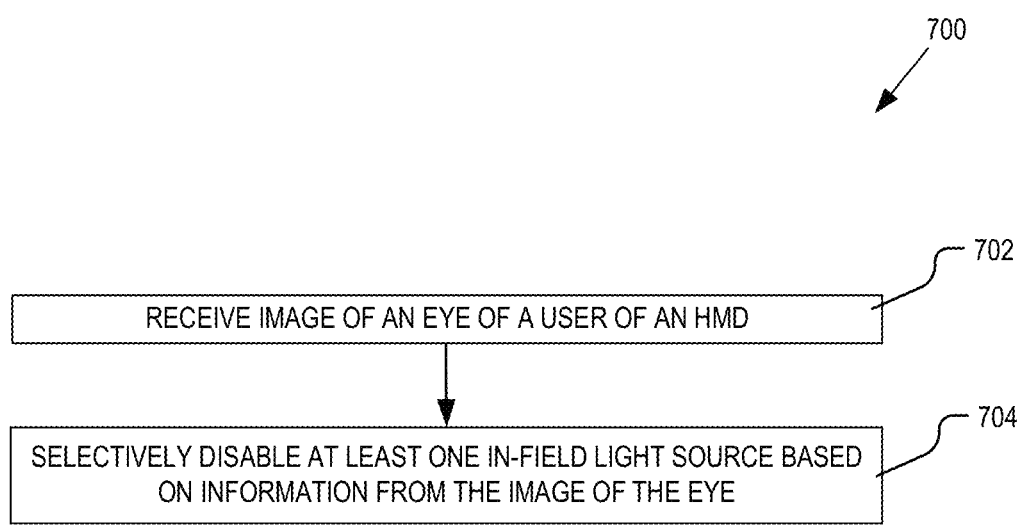
FIG. 7 is a flow chart that illustrates an example process for the active control of in-field light sources, in accordance with aspects of the present disclosure.

FIG. 7 is a flow chart that illustrates an example process 700 for the active control of in-field light sources, in accordance with aspects of the present disclosure. Process 700 is one possible process performed by the computing device 602 of FIG. 6. In a process block 702, the eye-tracking module 612 receives an image (e.g., image 302, 402A, 402B, or 502) of an eye of a user of an HMD (e.g., HMD 100). As discussed above, the image may be an image captured by an eye-tracking camera (e.g., eye-tracking camera 108A) in response to infrared light emitted by a plurality of in-field light sources (e.g., in-field light sources 116A). Furthermore, the image may include specular reflections of the eye (e.g., specular reflections 308A-E) as well as direct-views of the in-field light sources (e.g., direct-views 310A-310Y).

In process block 704, the eye-tracking module 612 then determines a current keep-out zone based on information obtained from the image. In one example, the eye-tracking module 612 determines the keep-out zone based on the current location 404A, 404B, or 504A of the eye by detecting the location of one or more of the specular reflections (e.g., by detecting the location of the intensity peaks) within the image. In some examples, the eye-tracking module 612 may also be configured to determine a predicted future keep-out zone (e.g., predicted future location 504B) based, in part, on the determined current keep-out zone.

In process block 704, the in-field light source control module 614 also selectively disables at least one of the in-field light sources based on the information obtained from the image (e.g., based on the current location of the eye within the image). As discussed above, the determination of which of the in-field light sources to disable may be based on a determination that a direct-view of the in-field light source will impede a detection of at least one specular reflection in a subsequent image. The determination that a direct-view will impede the detection of a specular reflection may be based on the predetermined radius, such as predetermined radius 406 of FIGS. 4A and 4B, or it may be based on the predicted future location, such as the predicted future location 504B of FIG. 5.

Keep-Out Zone for In-Field Light Sources

The above embodiments discussed with reference to FIGS. 4A-7 provide for the active control of the in-field light sources for reducing or eliminating the occurrences of a direct-view of an in-field light source from impeding the detection of the specular reflections that are present in an image captured by an eye-tracking camera of an HMD. The embodiments discussed below with reference to FIGS. 8-11 also provide for reducing the occurrences of the direct-views that impede the detection of specular reflections, but rather than the active control discussed above, the examples provide an illumination layer (e.g., illumination layer 112A of FIG. 1) that is configured to include a static keep-out zone. As will be described further, the keep-out zone may be a region of the illumination layer that does not include any in-field light sources. That is, the illumination layer may include several in-field light sources disposed therein, but where all of the in-field light sources are disposed outside of the static keep-out zone.

Figure 8:
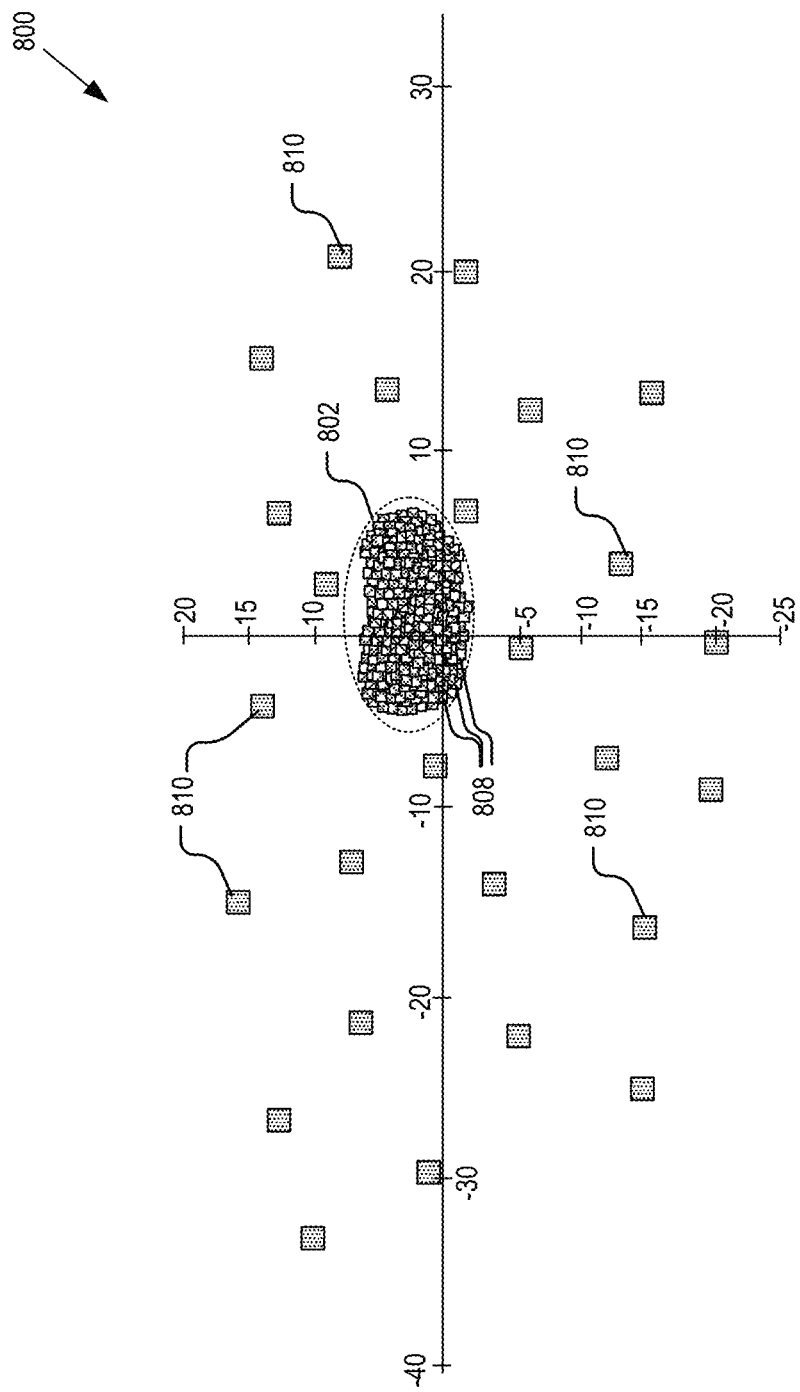
FIG. 8 illustrates the locations of specular reflections for numerous eye-positions relative to the locations of direct-views of the in-field light sources of a head mounted display, in accordance with aspects of the present disclosure.

FIG. 8 illustrates the locations of specular reflections 808 for numerous eye-positions relative to the locations of direct-views 810 of the in-field light sources as they would appear in an image captured by an eye-tracking camera (e.g., eye-tracking camera 108A) of an HMD, in accordance with aspects of the present disclosure. In some aspects, the data illustrated in FIG. 8 represents a modeling 800 of direct-views 810 of in-field light sources as well as specular reflections 808 for a variety of eye-positions and/or gaze angles of an eye of a user of the HMD (e.g., HMD 100). The modeling 800 may be obtained through empirical data gathering and/or computer-based simulations for various eye-positions and/or gaze angles.

As shown in FIG. 8, the location of the direct-views 810 appearing in the modeling 800 remains the same, due to the fact that a position and orientation of the eye-tracking camera 108A relative to the illumination layer 112A is fixed. The modeling 800 of FIG. 8 also illustrates how the locations of the specular reflections 808 vary with changes in the eye-positions and/or gaze angles. However, the modeling 800 performed by the Applicant reveals that despite the locations of the specular reflections 808 varying, these variances are relatively small and contained within a region 802. In some examples, the modeling 800 reveals that for all eye-positions and all gaze angles of the eye, all the resulting specular reflections 808 will appear within the region 802. Accordingly, some aspects of the present disclosure include an illumination layer that includes in-field light sources disposed thereon, such that their corresponding direct-views 810 appear outside of the region 802, so as to prevent the direct-views from impeding the detection of the specular reflections 808. As will be shown below, in some examples, the illumination layer includes a keep-out zone that has a size and/or shape that is based on the modeling 800, where all in-field light sources are disposed within the illumination layer outside of the designated keep-out zone.

Figure 9:
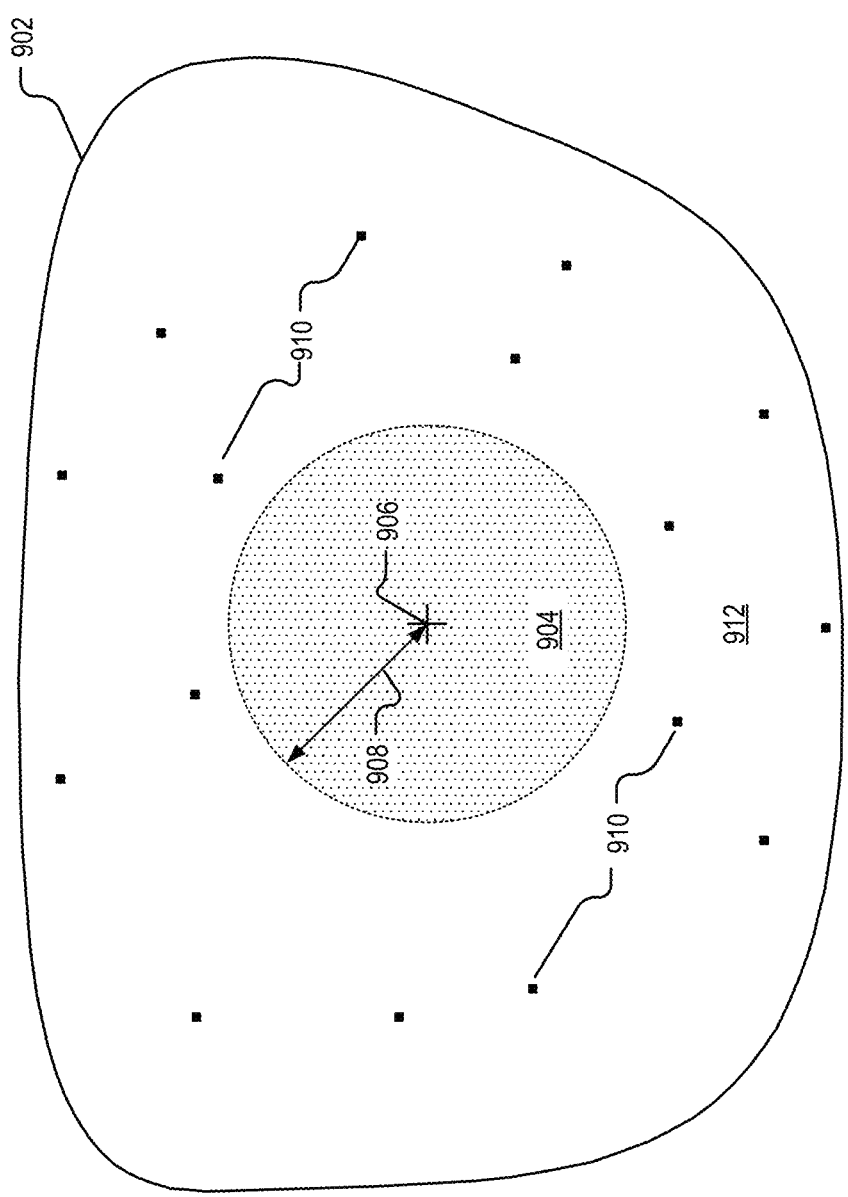
FIG. 9 illustrates an example illumination layer that includes a plurality of in-field light sources are arranged within the illumination layer outside of a keep-out zone, in accordance with aspects of the present disclosure.

FIG. 9 illustrates an example illumination layer 902 that includes a plurality of in-field light sources 910 that are arranged within the illumination layer 902 outside of a keep-out zone 904, in accordance with aspects of the present disclosure. Illumination layer 902 is one possible implementation of illumination layer 112A of FIGS. 1 and 2. In some aspects, keep-out zone 904 has a size and/or shape that is based on the modeling 800 of FIG. 8. For example, the keep-out zone 904 of FIG. 9 is shown as having a circular shape that includes a radius 908. In some examples, the radius 908 is 9 millimeters. In some examples, the radius 908 is greater than 9 millimeters. In some examples, the keep-out zone 904 includes a center 906, where the center 906 a location of the center 906 is to be aligned with a center of the eye when the eye is in a centered orientation (e.g., when the eye of the user of the HMD is looking straight forward). In some aspects, the center 906 is coincident with an optical center of the near-eye optical element 106A.

The size and shape of keep-out zone 904 is configured such that when the in-field light sources 910 are disposed outside of the keep-out zone 904, within region 912, their corresponding direct-views are prevented from impeding the detection of the specular reflections of the eye. The illustrated example of illumination layer 902 shows the in-field light sources 910 arranged within the region 912 of the illumination layer 902 in a sparse pattern. However, the in-field light sources 910 may arranged in any pattern, outside of the keep-out zone 904, consistent with the teachings provided herein.

Figure 10:
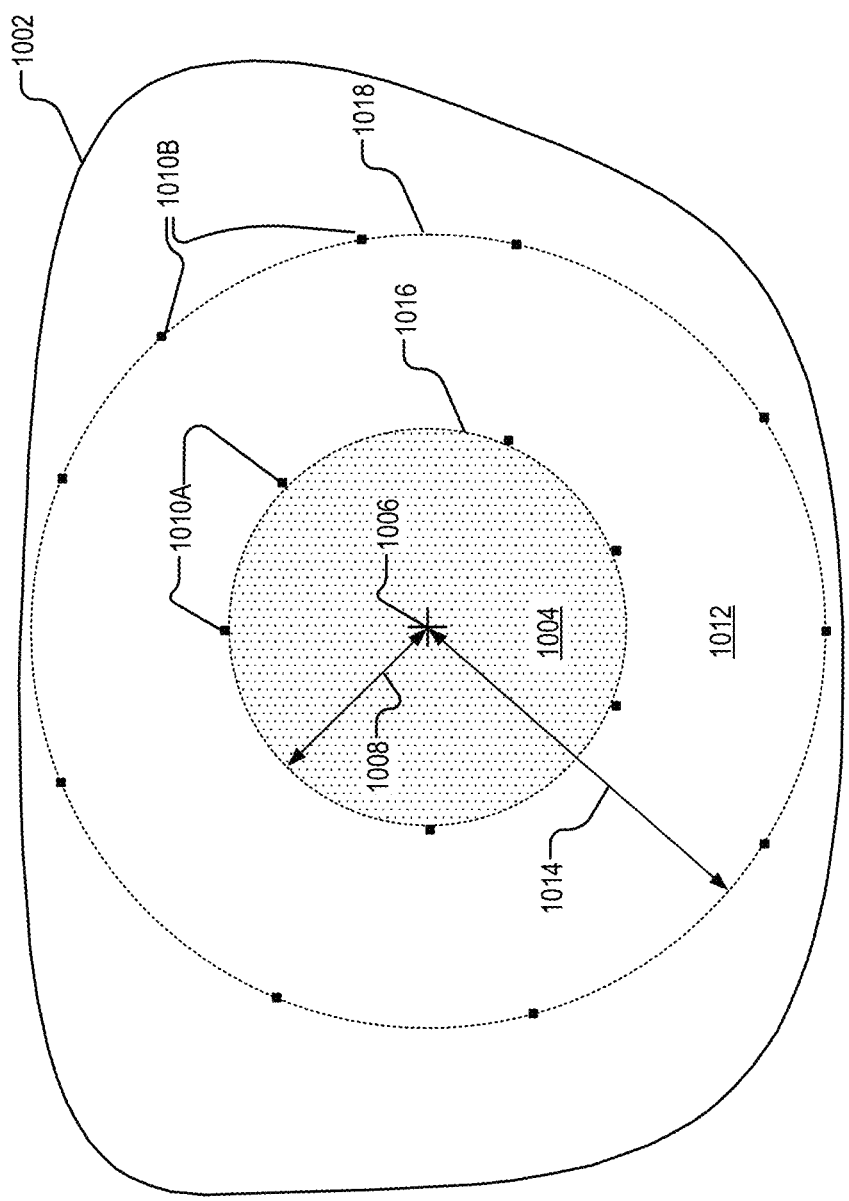
FIG. 10 illustrates an example illumination layer that includes a plurality of in-field light sources are arranged in a concentric pattern outside of a keep-out zone, in accordance with aspects of the present disclosure.

FIG. 10 illustrates an example illumination layer 1002 that includes a plurality of in-field light sources 1010A and 1010B that are arranged in a concentric pattern outside of a keep-out zone 1004, in accordance with aspects of the present disclosure. Illumination layer 1002 is one possible implementation of illumination layer 112A of FIGS. 1 and 2.

In some aspects, keep-out zone 1004 has a size and/or shape that is based on the modeling 800 of FIG. 8. For example, the keep-out zone 1004 of FIG. 10 is shown as having a circular shape that includes a radius 1008. In some examples, the radius 1008 is 9 millimeters. In some examples, the radius 908 is greater than 9 millimeters. In some examples, the keep-out zone 1004 includes a center 1006, where a location of the center 1006 is to be aligned with a center of the eye when the eye is in a centered orientation (e.g., when the eye of the user of the HMD is looking straight forward). In some aspects, the center 1006 is coincident with an optical center of the near-eye optical element 106A.

The size and shape of keep-out zone 1004 is configured such that when the in-field light sources 1010A and 1010B are disposed outside of the keep-out zone 1004, within region 1012, their corresponding direct-views are prevented from impeding the detection of the specular reflections of the eye. The illustrated example of illumination layer 1002 shows in-field light sources 1010A arranged outside of the keep-out zone 1004 and on a periphery 1016 of the circular shape of the keep-out zone 1004. Illumination layer 1002 also includes in-field light sources 1010B arranged outside of the keep-out zone 1004 and in a circular pattern 1018. In some examples, the circular pattern 1018 is concentric with the circular shape of the keep-out zone 1004. Furthermore, the circular pattern 1018 may include a radius 1014 that is 18 millimeters.

Figure 11:
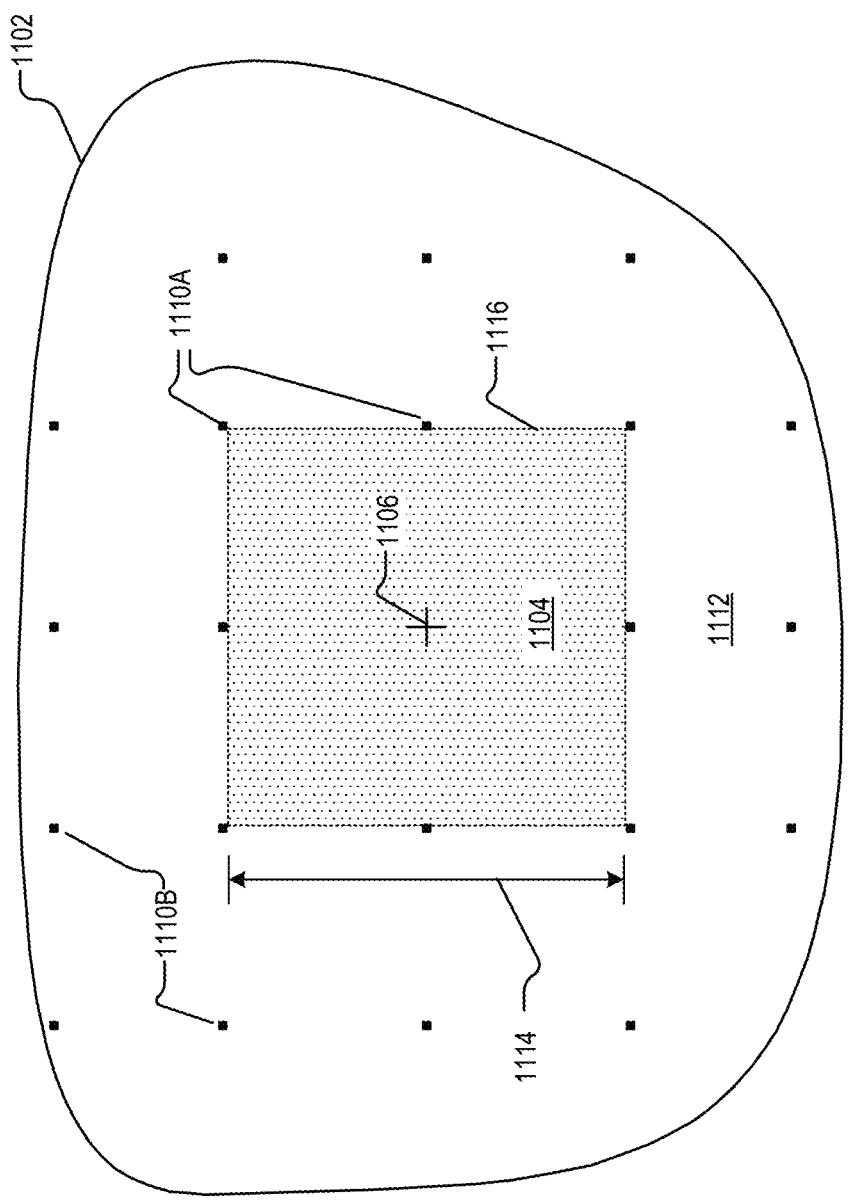
FIG. 11 illustrates an example illumination layer that includes a plurality of in-field light sources arranged in a grid pattern outside of a keep-out zone, in accordance with aspects of the present disclosure.

FIG. 11 illustrates an example illumination layer 1102 that includes a plurality of in-field light sources 1110A and 1110B that are arranged in a grid pattern outside of a keep-out zone 1104, in accordance with aspects of the present disclosure. Illumination layer 1102 is one possible implementation of illumination layer 112A of FIGS. 1 and 2.

In some aspects, keep-out zone 1104 has a size and/or shape that is based on the modeling 800 of FIG. 8. For example, the keep-out zone 1104 of FIG. 11 is shown as having a rectangular shape that includes a height/width 1114. In some examples, the height/width 1114 is 9 millimeters. In some examples, the keep-out zone 1104 includes a center 1106, where a location of the center 1106 is to be aligned with a center of the eye when the eye is in a centered orientation (e.g., when the eye of the user of the HMD is looking straight forward). In some aspects, the center 1106 is coincident with an optical center of the near-eye optical element 106A.

The size and shape of keep-out zone 1104 is configured such that when the in-field light sources 1110A and 1110B are disposed outside of the keep-out zone 1104, within region 1112, their corresponding direct-views are prevented from impeding the detection of the specular reflections of the eye. The illustrated example of illumination layer 1102 shows in-field light sources 1110A arranged outside of the keep-out zone 1104 and on a periphery 1116 of the rectangular shape of the keep-out zone 1104. Both the in-field light sources 1110A and 1110B are shown as disposed within the Illumination layer 1102 in a grid pattern. In some examples, the grid pattern includes in-field light sources 1110A and 1110B arranged in parallel rows and columns. In some examples, the in-field light sources 1110 and 1110B are disposed within the illumination layer 1102 such that they are separated from one another by at least 9 millimeters.

In some examples, the regions represented by keep-out zones 904, 1004, and 1104 may be used in conjunction with the active control of the in-field light sources described above with reference to FIGS. 4A-7. For example, with reference to FIG. 6, the eye-tracking module 612, in some instances, may become lost, where the eye-tracking module 612 loses (i.e., cannot determine) the current position of the eye. In these situations, the eye-tracking module 612 may be configured to mask out or ignore the direct-views of any in-field light sources that appear within the regions represented by the keep-out zones until a current position of the eye is re-attained. By way of further example, referring to FIG. 4A, the eye-tracking module may mask out the intensity peaks corresponding to direct-views 410G, 410H, 410L, 410M, 410Q, and 410R in response to losing a current location of the eye and if the eye-tracking module determines these direct-views correspond to in-field light sources disposed within a region such as the keep-out zones 904, 1004, and 1104.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method, comprising:
receiving an image of an eye of a user of a head mounted display (HMD) captured by an eye-tracking camera that is disposed on an eyeward side of a near-eye optical element of the HMD, facing a plurality of in-field light sources included in the near-eye optical element, to generate the image in response to direct infrared light received from the plurality of in-field light sources and in response to reflected infrared light that includes specular reflections of the eye; and
selectively disabling at least one in-field light source of the plurality of in-field light sources based on information from the image of the eye.

2. The computer-implemented method of claim 1, further comprising:
processing the image to detect the specular reflections; and
determining that a direct-view of the at least one in-field light source in a subsequent image will impede a detection of at least one specular reflection in the subsequent image.

3. The computer-implemented method of claim 1, further comprising:
disabling the at least one in-field light source in response to determining that a direct view of the at least one in-field light source is within a predetermined radius of a keep-out zone, wherein the keep-out zone is defined by information from the image of the eye.

4. The computer-implemented method of claim 1, further comprising:
determining a predicted future keep-out zone within a subsequent image based, in part, on the information from the image; and
disabling the at least one in-field light source based on the predicted future keep- out zone.

5. The computer-implemented method of claim 1, further comprising:
receiving a subsequent image of the eye from the eye-tracking camera; and
enabling the at least one in-field light source based on information from the subsequent image.

6. A computing device for a head mounted display (HMD), the computing device comprising:
at least one processor; and
at least one memory coupled to the at least one processor, the at least one memory having instructions stored therein, which when executed by the at least one processor, direct the computing device to:
receive an image of an eye of a user of the HMD captured by an eye-tracking camera that is disposed on an eyeward side of a near-eye optical element of the HMD, facing a plurality of in-field light sources included in the near-eye optical element, to generate the image in response to direct infrared light received from the plurality of in-field light sources and in response to reflected infrared light that includes specular reflections of the eye;
determine a keep-out zone based on information from the image of the eye; and
selectively disable at least one in-field light source of the plurality of in-field light sources based on the keep-out zone.

7. The computing device of claim 6, wherein the at least one memory further comprises instructions to direct the computing device to:
  process the image to detect the specular reflections; and
  determine that a direct-view of the at least one in-field light source in a subsequent image will impede a detection of at least one specular reflection in the subsequent image.

8. The computing device of claim 6, wherein the at least one memory further comprises instructions to direct the computing device to:
  disable the at least one in-field light source in response to determining that a direct view of the at least one in-field light source is within a predetermined radius of the keep-out zone.

9. The computing device of claim 6, wherein the at least one memory further comprises instructions to direct the computing device to:
  determine a predicted future keep-out zone within a subsequent image based, in part, on the keep-out zone; and
  disable the at least one in-field light source based on the predicted future keep-out zone.

10. The computing device of claim 6, wherein the at least one memory further comprises instructions to direct the computing device to:
  receive a subsequent image of the eye from the eye-tracking camera;
  determine an updated keep-out zone; and
  enable the at least one in-field light source based on the updated keep-out zone.

11. A head mounted display (HMD), comprising:
  an eye-tracking camera configured to capture an image of an eye of a user of the HMD;
  a near-eye optical element that includes:
    a plurality of in-field light sources configured to emit infrared light to illuminate the eye of the user; and
    an optical combiner disposed between the in-field light sources and a back side of the HMD, wherein the optical combiner is configured to receive reflected infrared light that is reflected by the eye of a user of the HMD and to direct the reflected infrared light towards the eye-tracking camera, wherein the eye-tracking camera is disposed on an eyeward side of the near-eye optical element, facing the plurality of in-field light sources, to generate the image in response to direct infrared light received from the plurality of in-field light sources and in response to the reflected infrared light directed to the eye-tracking camera by the optical combiner;
  at least one processor coupled to the eye-tracking camera; and
  at least one memory coupled to the at least one processor, the at least one memory having instructions stored therein, which when executed by the at least one processor, direct the at least one processor to:
  receive the image of the eye of the user captured by the eye-tracking camera;
    determine a keep-out zone based on information from the image; and
    selectively disable at least one in-field light source of the plurality of in-field light sources based on the keep-out zone.

12. The HMD of claim 11, wherein the at least one memory further comprises instructions to direct the at least one processor to:
  process the image to detect specular reflections of the eye; and
  determine that a direct-view of the at least one in-field light source in a subsequent image will impede a detection of at least one specular reflection in the subsequent image.

13. The HMD of claim 12, wherein locations of the specular reflections correspond to intensity peaks within the image.

14. The HMD of claim 11, wherein the at least one memory further comprises instructions to direct the at least one processor to:
  disable the at least one in-field light source in response to determining that a direct view of the at least one in-field light source is within a predetermined radius of the keep-out zone.

15. The HMD of claim 11, wherein the at least one memory further comprises instructions to direct the at least one processor to:
  determine a predicted future keep-out zone based, in part, on the keep-out zone; and
  disable the at least one in-field light source based on the predicted future keep-out zone.

16. The HMD of claim 11, wherein the at least one memory further comprises instructions to direct the at least one processor to:
  receive a subsequent image of the eye from the eye-tracking camera;
  determine an updated keep-out zone based on information from the subsequent image; and
  enable the at least one in-field light source based on the updated keep-out zone.

17. The HMD of claim 11, wherein the in-field light sources comprise vertical cavity surface emitting laser (VCSEL) diodes.

* * * * *